(12) United States Patent
Ikeda

(10) Patent No.: US 11,992,884 B2
(45) Date of Patent: May 28, 2024

(54) CUTTING INSERT, CUTTING TOOL, AND METHOD FOR MANUFACTURING MACHINED PRODUCT

(71) Applicant: KYOCERA Corporation, Kyoto (JP)

(72) Inventor: Yoshihito Ikeda, Ritto (JP)

(73) Assignee: KYOCERA Corporation, Kyoto (JP)

( * ) Notice: Subject to any disclaimer, the term of this patent is extended or adjusted under 35 U.S.C. 154(b) by 484 days.

(21) Appl. No.: 17/260,689

(22) PCT Filed: Jul. 17, 2019

(86) PCT No.: PCT/JP2019/028073
§ 371 (c)(1),
(2) Date: Jan. 15, 2021

(87) PCT Pub. No.: WO2020/017548
PCT Pub. Date: Jan. 23, 2020

(65) Prior Publication Data
US 2021/0323074 A1     Oct. 21, 2021

(30) Foreign Application Priority Data
Jul. 18, 2018  (JP) .................................. 2018-134966

(51) Int. Cl.
*B23B 27/14*     (2006.01)
*B23B 1/00*      (2006.01)
*B23B 27/16*     (2006.01)

(52) U.S. Cl.
CPC ............ *B23B 27/1611* (2013.01); *B23B 1/00* (2013.01); *B23B 27/143* (2013.01)

(58) Field of Classification Search
CPC ........ B23B 2200/085; B23B 2200/201; B23B 2200/242; B23B 2200/283;
(Continued)

(56) References Cited

U.S. PATENT DOCUMENTS 4,616,963 A    10/1986  Habert et al.
5,193,947 A *   3/1993  Bernadic ............... B23B 27/143
                                                D15/139
(Continued)

FOREIGN PATENT DOCUMENTS

JP        58-201069 A      7/1983
JP      2007-260848 A     10/2007
(Continued)

OTHER PUBLICATIONS

Onozawa JP 2007-290057, Machine Translation (Year: 2007).*

*Primary Examiner* — Nicole N Ramos
(74) *Attorney, Agent, or Firm* — Volpe Koenig

(57) ABSTRACT

A cutting part of a cutting insert may include a first surface including a corner, a first side, a first region, a second region and a third region. The first region may be located along the corner and the first side. The second region may be located at a more inner part than the first region. The third region may be located at a more inner part than the second region. A boundary between the corner and the first side may be a first point. A boundary between the first region and the second region may be a second point in a cross section that passes through the first point and is orthogonal to the first side. An imaginary straight line passing through the first point and the second point may be a first imaginary straight line. The first imaginary straight line may intersect with the third region.

6 Claims, 15 Drawing Sheets

(58) Field of Classification Search
CPC ........ B23B 2200/323; B23B 2200/328; B23B 2200/3609; B23B 2200/3663; B23B 2200/3672; B23B 2270/30; B23B 27/045; B23B 27/14; B23B 27/141; B23B 27/143; B23B 27/16; B23B 27/1607; B23B 27/1614; B23B 27/1618; B23B 27/1655; B23C 2200/081; B23C 2200/20; B23C 2200/201; B23C 2200/243; B23C 2200/283; B23C 2200/32; B23C 2200/323; B23C 2200/326; B23C 2200/365; B23C 2210/486

See application file for complete search history.

(56) References Cited

U.S. PATENT DOCUMENTS

| | | | |
|---|---|---|---|
| 2016/0214180 A1 | 7/2016 | Sasaki | |
| 2016/0297010 A1* | 10/2016 | Kukino | ............... B24B 3/34 |
| 2020/0009664 A1* | 1/2020 | Ikeda | ............... B23B 27/22 |

FOREIGN PATENT DOCUMENTS

| | | | |
|---|---|---|---|
| JP | 2007-290057 A | | 11/2007 |
| JP | 2007290057 A | * | 11/2007 |
| JP | 2014-188606 A | | 10/2014 |
| WO | 2015/083716 A1 | | 6/2015 |

* cited by examiner

CUTTING INSERT, CUTTING TOOL, AND METHOD FOR MANUFACTURING MACHINED PRODUCT

CROSS-REFERENCE TO RELATED APPLICATION

This application is a national stage entry according to 35 U.S.C. 371 of PCT Application No. PCT/JP2019/028073 filed on Jul. 17, 2019, which claims priority to Japanese Application No. 2018-134966 filed on Jul. 18, 2018, which are entirely incorporated herein by reference.

TECHNICAL FIELD

The present disclose relates to a cutting insert, a cutting tool and a method for manufacturing a machined product.

BACKGROUND

For example, a cutting tool (cutting insert) is discussed in WO 2015/083716 (Patent Document 1) and may be used as a cutting tool used for carrying out a cutting process of a workpiece, such as a high hardness material. The cutting insert discussed in Patent Document 1 may include a honed surface and a breaker wall surface, and may be formed of an ultra-high pressure sintered body including cubic boron nitride or diamond.

Chip disposal may become unstable in a cutting process of a workpiece of a high hardness material, such as hardened steel. This may be because a surface of the hardened steel has relatively high hardness but the interior thereof has relatively low hardness. If the cutting process of the workpiece of the high hardness material is carried out using the cutting insert formed of the ultra-high pressure sintered body as discussed in Patent Document 1, a width of the honed surface (land surface) may be set to a large value, or alternatively a honing angle (land angle) may be set to a large value in order to enhance durability necessary to cut out the surface of the hardened steel which has the relatively high hardness.

In the case of cutting out the interior of the hardened steel which has the relatively low hardness, chips in unstable state may tend to flow along the honed surface. Because the breaker wall surface is low and located away from the cutting edge in the insert described in Patent Document 1, the breaker wall surface may fail to handle the chips.

SUMMARY

A cutting insert in non-limiting aspects of the present disclosure may include a base and a cutting part. The cutting part may include a sintered body of cubic boron nitride or diamond and connects to the base. The cutting part may include a first surface, a second surface and a third surface. The second surface may be located on a side opposite to the first surface. The third surface may be located between the first surface and the second surface. The first surface may include a corner, a first side, a first region, a second region and a third region. The first side may be extended from the corner. The first region may be located along the corner and the first side and may be inclined upward toward an inner part of the first surface. The second region may be located along the first region at a more inner part than the first region and may be inclined relative to the first region. The third region may be located at a more inner part than the second region and may be inclined upward. A boundary between the corner and the first side may be a first point. A boundary between the first region and the second region may be a second point in a cross section which passes through the first point and is orthogonal to the first side in a plan view of the first surface. An imaginary straight line passing through the first point and the second point may be a first imaginary straight line. The first imaginary straight line may intersect with the third region.

EMBODIMENTS

<Cutting Inserts>

Figure 1:
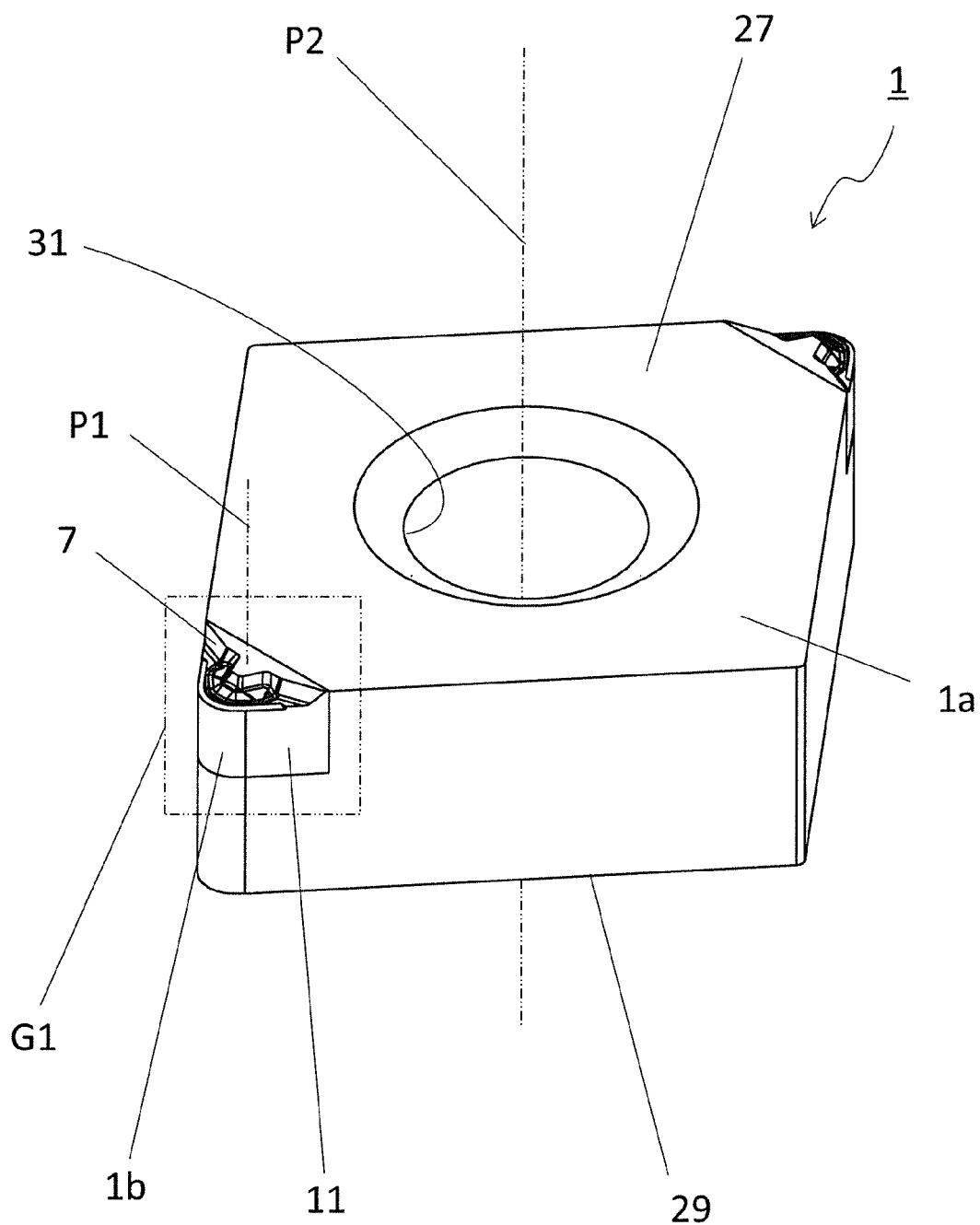
FIG. 1 is a perspective view illustrating a cutting insert in non-limiting aspects of the present disclosure.

The cutting insert 1 (hereinafter also referred to simply as "the insert 1") in non-limiting embodiments of the present disclosure may be described in detail below with reference to the drawings. For convenience of description, the drawings referred to in the following may illustrate, in simplified form, only main members necessary for describing the insert 1 in the non-limiting embodiments. The cutting insert 1 in the present disclosure may therefore be capable of including any arbitrary structural member not illustrated in the drawings referred to. Dimensions of the members in each of the drawings may faithfully represent neither dimensions of actual structural members nor dimensional ratios of these members.

The insert 1 may include a base 1*a* and a cutting part 1*b* as in a non-limiting embodiment illustrated in FIG. 1. The cutting part 1*b* may connect to the base 1*a* and may be a sintered body including at least one of cubic boron nitride (cBN) and diamond. In other words, the cutting part 1*b* may include a sintered body of cubic boron nitride or diamond.

The insert 1 may have a polygonal plate shape as a whole. The insert 1 may have an approximately quadrangular plate shape in the non-limiting embodiment illustrated in FIG. 1. The base 1a may have an approximately polygonal plate shape, and a part of corners may be cut off. The base 1a may have an approximately quadrangular plate shape and a part of the corners may be cut off as in the non-limiting embodiment illustrated in FIG. 1. The cutting part 1b may connect to the part thus cut off by using, for example, a brazing filler metal. The cutting part 1b may have an approximately triangular plate shape as in the non-limiting embodiment illustrated in FIG. 1.

The base 1a and the cutting part 1b are not limited to the above configurations. For example, the base 1a and the cutting part 1b may individually have a quadrangular plate shape and may have the same shape in plan view. The cutting part 1b having the quadrangular plate shape may be located on the base 1a having the quadrangular plate shape. The cutting part 1b may include a first surface 7, a second surface 9 and a third surface 11. The second surface 9 may be located on a side opposite to the first surface 7. The third surface may be located between the first surface 7 and the second surface 9. The first surface 7 may include a first corner 3 and a first side 5 extended from the first corner 3 as in a non-limiting embodiment illustrated in FIG. 2. A part of the second surface 9 and a part of the third surface 11 in the cutting part 1b may connect to the base 1a as in the non-limiting embodiment illustrated in FIG. 2. The term "in a plan view" may denote viewing the first surface 7 from front.

Figure 2:
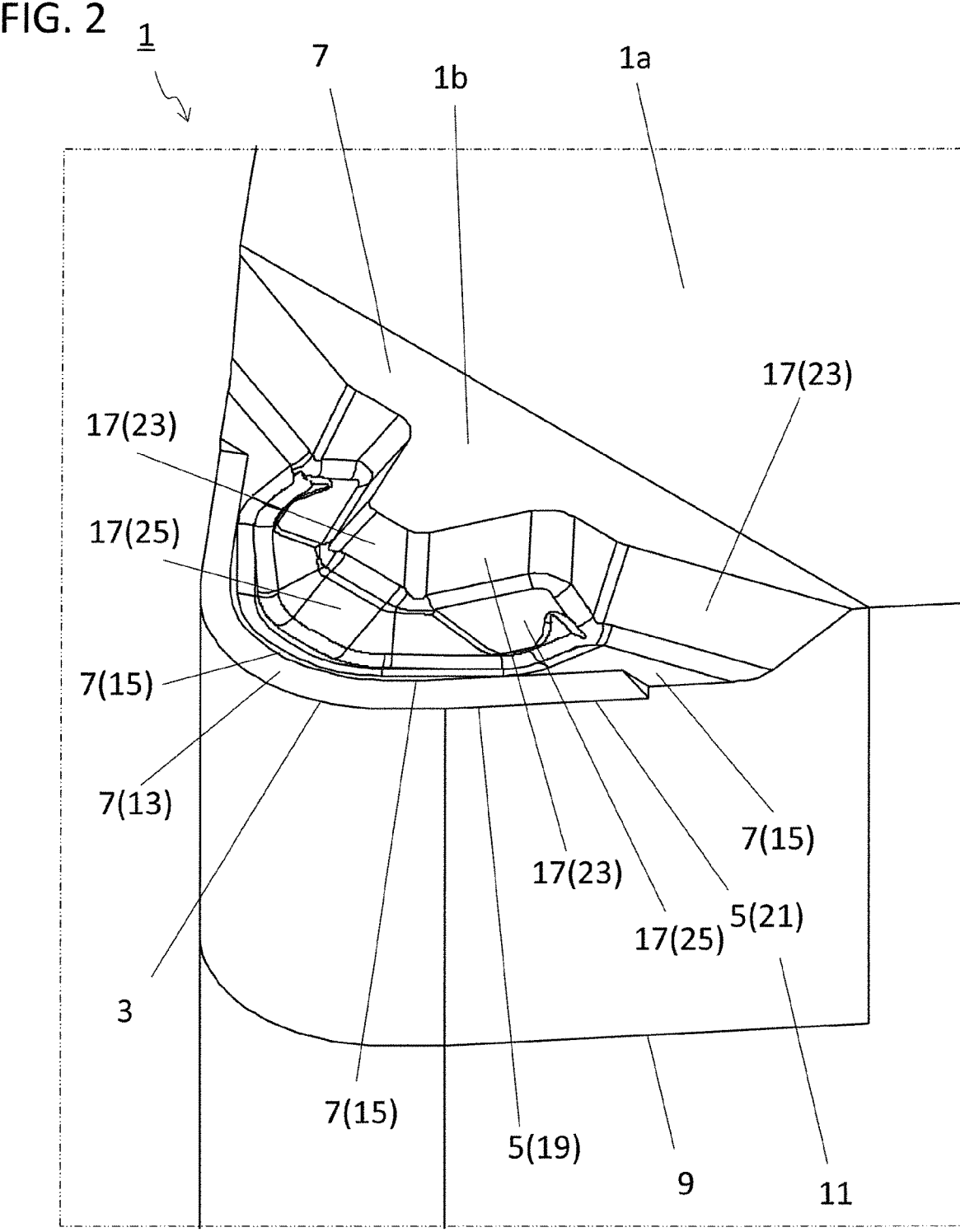
FIG. 2 is an enlarged view of a region G1 in FIG. 1.
Figure 3:
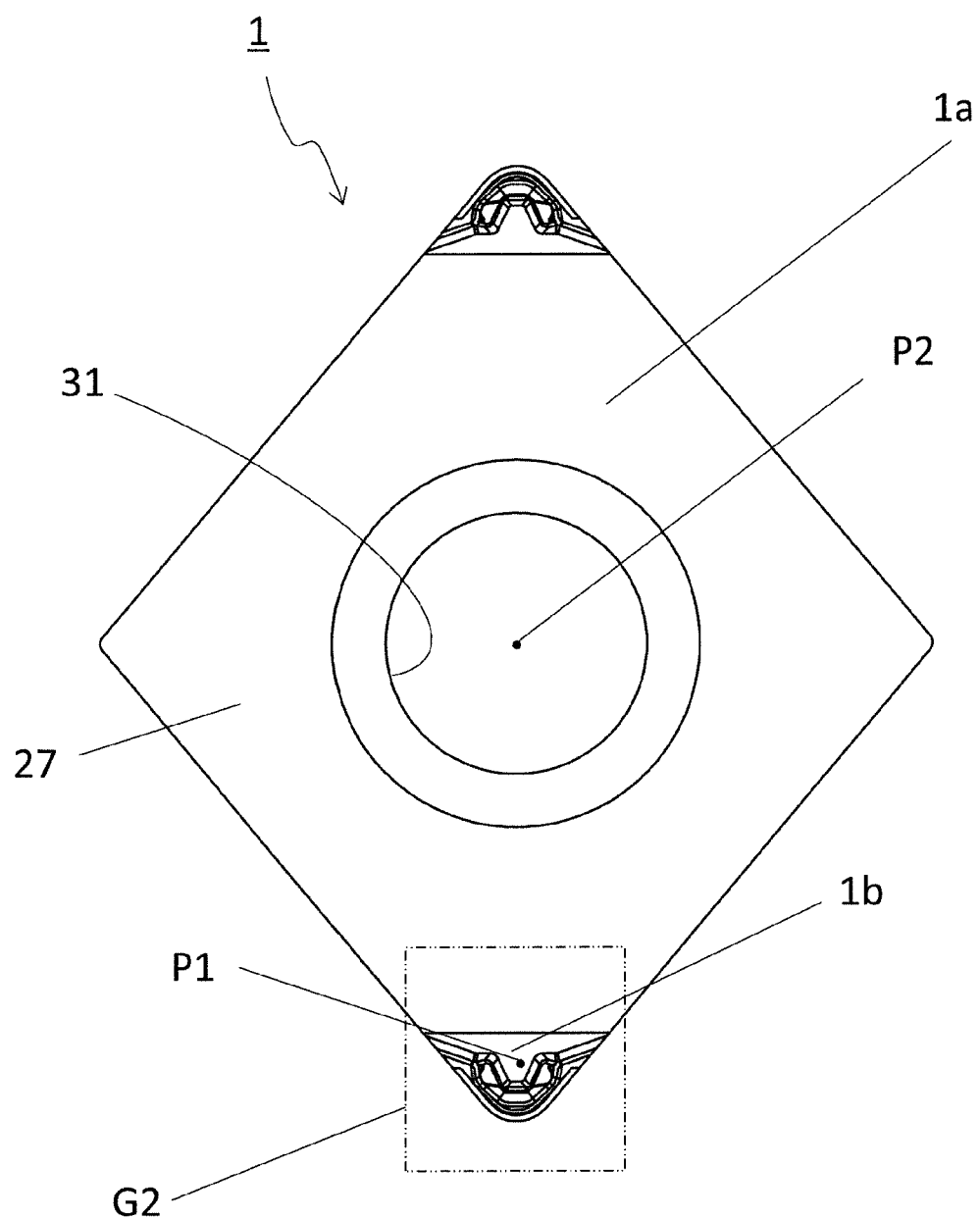
FIG. 3 is a top view of the cutting insert illustrated in FIG. 1.

The first surface 7 may be located above the cutting 1b in the non-limiting embodiment illustrated in FIG. 2. Therefore, the first surface 7 may be rephrased as the upper surface 7 for the sake of convenience. The second surface 9 may be located below the cutting part 1b in the non-limiting embodiment illustrated in FIG. 2. Therefore, the second surface 9 may be rephrased as the lower surface 9 for the sake of convenience. The third surface 11 may be located between the upper surface 9 and the lower surface 9 and may connect to these surfaces as in the non-limiting embodiment illustrated in FIG. 2. The third surface 11 may therefore be rephrased as the lateral surface 11 for the sake of convenience.

The upper surface 7 may have a polygonal shape. The upper surface 7 may have a triangular shape as in a non-limiting embodiment illustrated in FIG. 4. The upper surface 7 may include three corners and three sides as in the non-limiting embodiment illustrated in FIG. 4. If the upper surface 7 has the triangular shape, the lateral surface 11 may be made up of three surface regions. The shape of the upper surface 7 is not limited to that in the non-limiting embodiment illustrated in FIG. 4. For example, there is no problem even if the upper surface 7 has, besides the triangular shape, a quadrangular shape, a pentagonal shape, a hexagonal shape or an octagonal shape.

Figure 4:
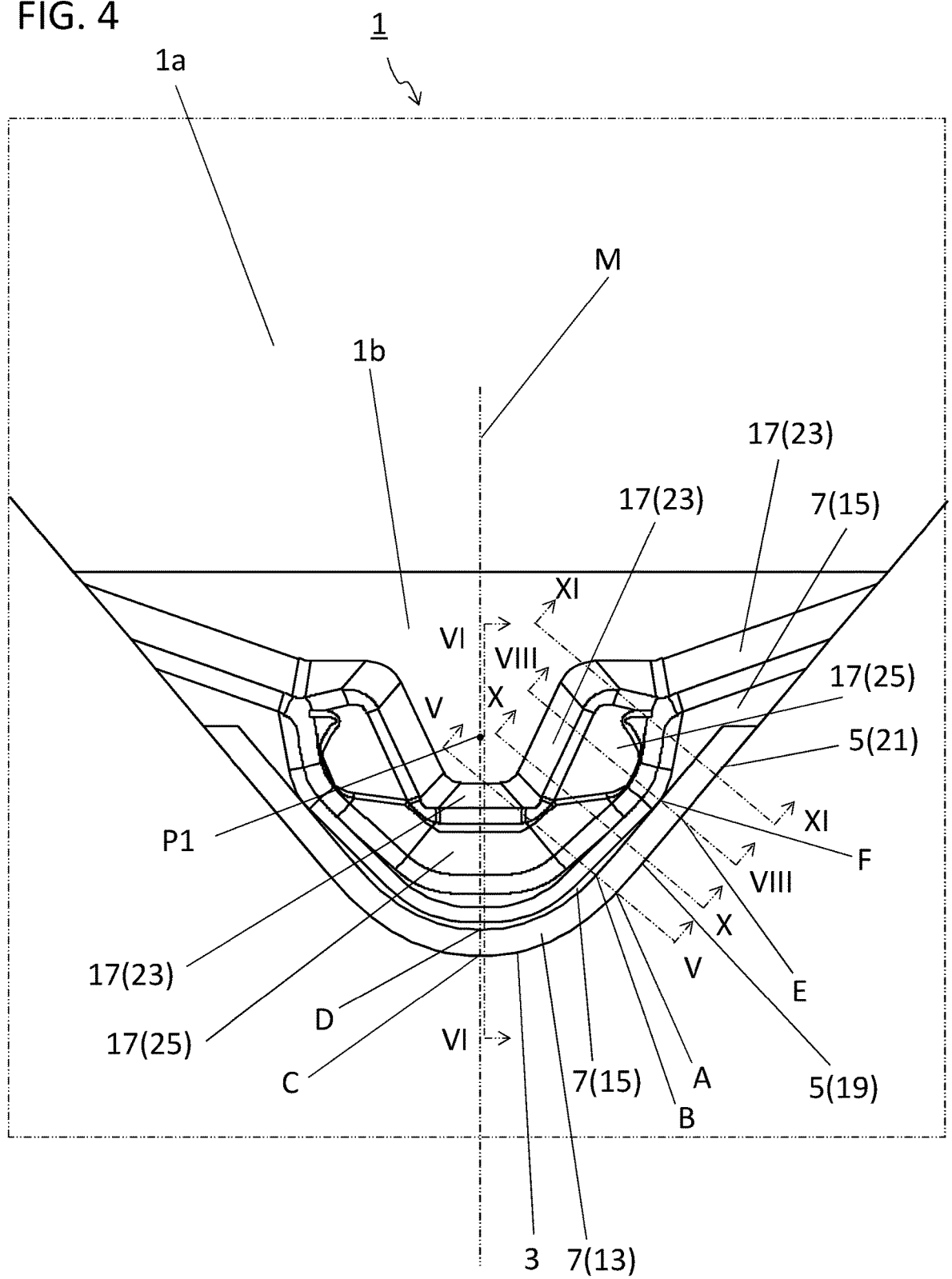
FIG. 4 is an enlarged view of a region G2 in FIG. 3.

The first corner 3 may be one of three corners of the upper surface 7 in FIG. 4. The first side 5 may be one of the three sides of the upper surface 7.

The upper surface 7 may have an approximately polygonal shape and need not have a strict polygonal shape. That is, the sides of the upper surface 7 having the polygonal shape do not need to have a strict straight line shape, but may have, for example, a convex curvilinear shape or concave curvilinear shape. The corners of the upper surface 7 having the polygonal shape are not limited to a structure where two straight lines intersect each other. For example, the corners may have a shape rounded outward.

The first side 5 may have a straight line shape in a plan view of the upper surface 7 as in the non-limiting embodiment illustrated in FIG. 4. The first corner 3 may have a convex curvilinear shape. Specifically, the first corner 3 may have a circular arc shape whose radius of curvature is constant, or alternatively may be made up of a plurality of portions different in radius of curvature. Hereinafter, the plan view of the upper surface 7 may be rephrased as a top plan view thereof.

Dimensions of the cutting part 1b are not particularly limited. For example, a length of the first side 5 of the upper surface 7 may be set to approximately 0.2-2 mm. A height from the upper surface 7 to the lower surface 9 may be set to approximately 2-8 mm.

The insert 1 may include a cutting edge located on a ridgeline where the upper surface 7 intersects with the lateral surface 11. The cutting edge may be used for cutting out a workpiece. The cutting edge may be located on the whole or a part of the ridgeline. For example, the cutting edge may be located on the first corner 3 of the upper surface 7 and on a part of the first side 5 being continuous with the first corner 3. The cutting edge may be located on the whole of the first corner 3 and in a partial region of the first side 5 which is adjacent to the first corner 3 as in the non-limiting embodiment illustrated in FIGS. 2 and 4.

The upper surface 7 may include a first region 13, a second region 15 and a third region 17 as illustrated in FIGS. 2 and 4 or the like. The first region 13 may be located along the first corner 3 and the first side 5, may be inclined upward toward an inner part of the upper surface 7. The first region 13 may be a flat surface or curved surface. If the first region 13 is the flat surface, the first region 13 may be called a chamfer. If the first region 13 is the curved surface, the first region 13 may be called a honed surface.

The second region 15 may be located along the first region 13 at a more inner part than the first region 13, or alternatively may be inclined relative to the first region 13. The third region 17 may be located at a more inner part than the second region 15, or alternatively may be inclined upward. The term "inclined upward" may denote being inclined so as to be located further away from the lower surface 9 (second surface 9) as going toward the inner part of the upper surface 7 (first surface 7).

The second region 15 may be inclined relative to the first region 13 as described above. Specifically, the second region 15 may be located closer to or parallel to the lower surface 9 as going toward the inner part of the upper surface 7. Alternatively, the second region 15 may be located further away from the lower surface 9 as going toward the inner part of the upper surface 7. If the second region 15 is located away from the lower surface 9 as described above, the second region 15 may have a more moderate inclination than the first region 13 and the third region 17.

Figure 5:
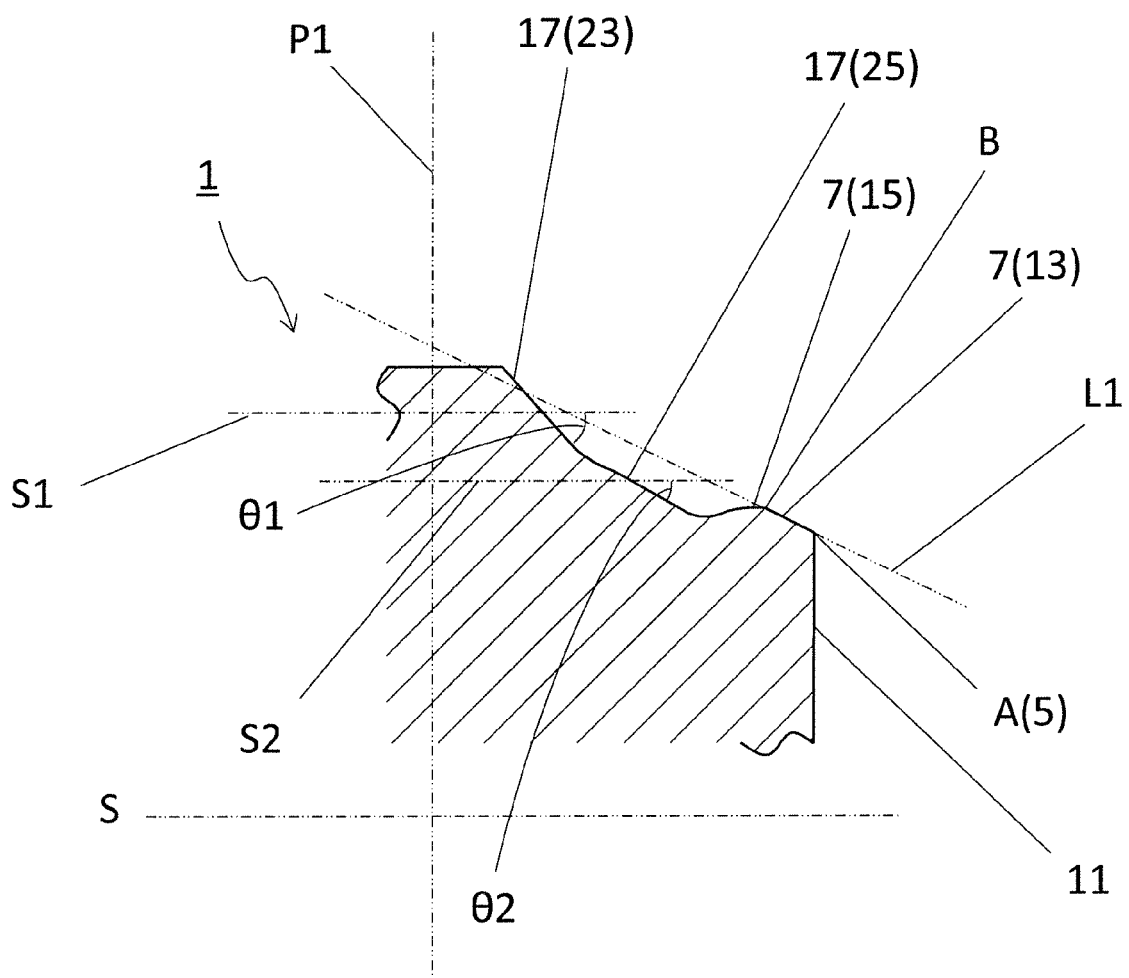
FIG. 5 is a cross-sectional view taken along the line V-V in FIG. 4.

A boundary between the first corner 3 and the first side 5 may be a first point A as illustrated in FIG. 2. FIG. 5 may illustrate a cross section that passes through the first point A and is orthogonal to the first side 5 in a plan view. A boundary between the first region 13 and the second region 15 may be a second point B as illustrated in FIG. 5. The boundary between the first region 13 and the second region 15 may be indicated by a line in the plan view, but the boundary may be indicated by a point in a sectional view as illustrated in FIG. 5. An imaginary straight line passing though the first point A and the second point B may be a first imaginary straight line L1.

An imaginary straight line passing through a center (center of gravity) of the upper surface 7 and a center (center of gravity) of the lower surface 9 may be a central axis P1. An imaginary flat surface orthogonal to the central axis P1 may be a reference plane S. FIG. 5 may also be a cross section that passes through the first point A and is orthogonal to the first side 5 in a plan view of the reference plane S. The lower surface 9 may be parallel to the reference plane S in a non-limiting embodiment illustrated in FIG. 5. In other words, the term "inclined upward" may denote being inclined so as to be further away from the reference plane S as going toward the inner part of the upper surface 7 (first surface 7).

The first imaginary straight line L1 may intersect with the third region 17 as in the non-limiting embodiment illustrated in FIG. 5. This may lead to enhanced chip discharge performance of the insert 1. The enhanced chip discharge performance may also be attainable, for example, in a cutting process of hardened steel that is one kind of high hardness materials.

A surface of the hardened steel may have high hardness and the interior thereof may have relatively lower hardness than the surface. In a case, the upper surface 7 includes the first region 13 being inclined upward, the cutting edge may be less likely to be fractured if cutting out the surface of the hardened steel having the relative high hardness. This may lead to enhanced durability.

In the non-limiting embodiment illustrated in FIG. 5, the upper surface 7 may include a third region 17 being inclined upward, and the third region 17 may intersect with the first imaginary straight line L1 as described above. Therefore, even if chips flow in a direction along the first region 13 if cutting out the interior of the hardened steel having the relatively low hardness, the chips may tend to be curved in the third region 17.

Additionally, if the upper surface 7 includes a second region 15 located between the first region 13 and the third region 17 in the non-limiting embodiment illustrated in FIG. 5, the chips may be more likely to be curved. This is because if the upper surface 7 includes the second region 15 having a smaller inclination than the first region 13 and the third region 17, it may be easy to ensure space for curving the chips on the second region 15.

Thus, the insert 1 in the non-limiting embodiment illustrated in FIG. 5 may have the enhanced chip discharge performance even in a cutting process of a member that is one kind of high hardness materials and has uneven hardness, such as hardened steel. Specifically, the insert 1 in the non-limiting embodiment illustrated in FIG. 5 may be less affected by machining conditions, such as materials of workpieces, and the insert 1 may therefore be highly versatile for the workpieces.

Figure 6:
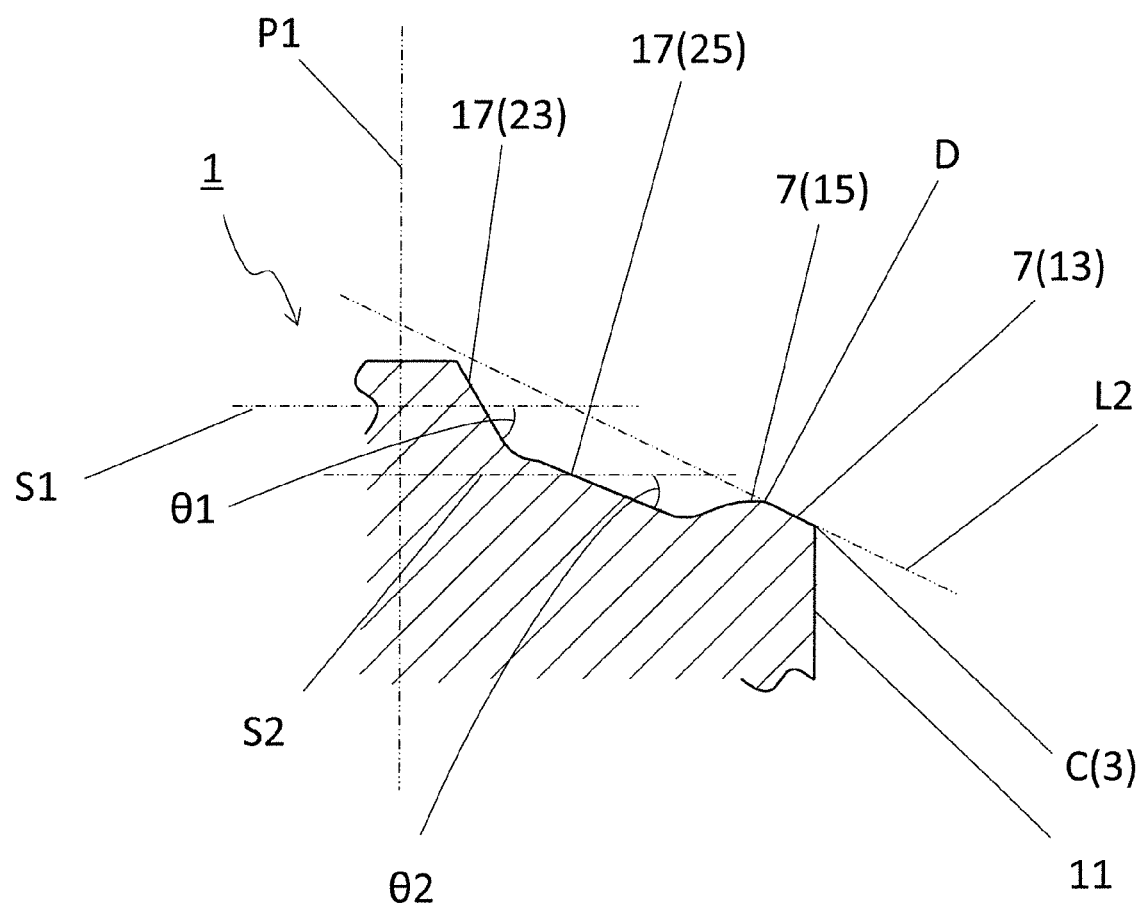
FIG. 6 is a cross-sectional view taken along the line VI-VI in FIG. 4.

The third region 17 may be located away from a second imaginary straight line L2 as in a non-limiting embodiment illustrated in FIG. 6. A boundary between the lateral surface 11 and the first region 13 at a position on a bisector M of the first corner 3 in a plan view of the upper surface 7 may be a third point C. A boundary between the second region 15 and the first region 13 at a position on the bisector M of the first corner 3 in the plan view of the upper surface 7 may be a fourth point D. An imaginary straight line passing through the third point C and the fourth point D may be the second imaginary straight line L2.

With the insert 1 including the above configuration, the third region 17 may not be too close to the cutting edge, and the chips may therefore not be forcibly bent, thereby facilitating to form a good chip shape. Consequently, the chips may be stably discharged, and chip clogging may be less likely to occur.

In cases where the first corner 3 has the convex curvilinear shape, an imaginary straight line which passes through a center of the first corner 3 and which is orthogonal to the first corner 3 at the center of the first corner 3 in the plan view of the upper surface 7 may be regarded as the bisector M of the first corner 3.

Figure 7:
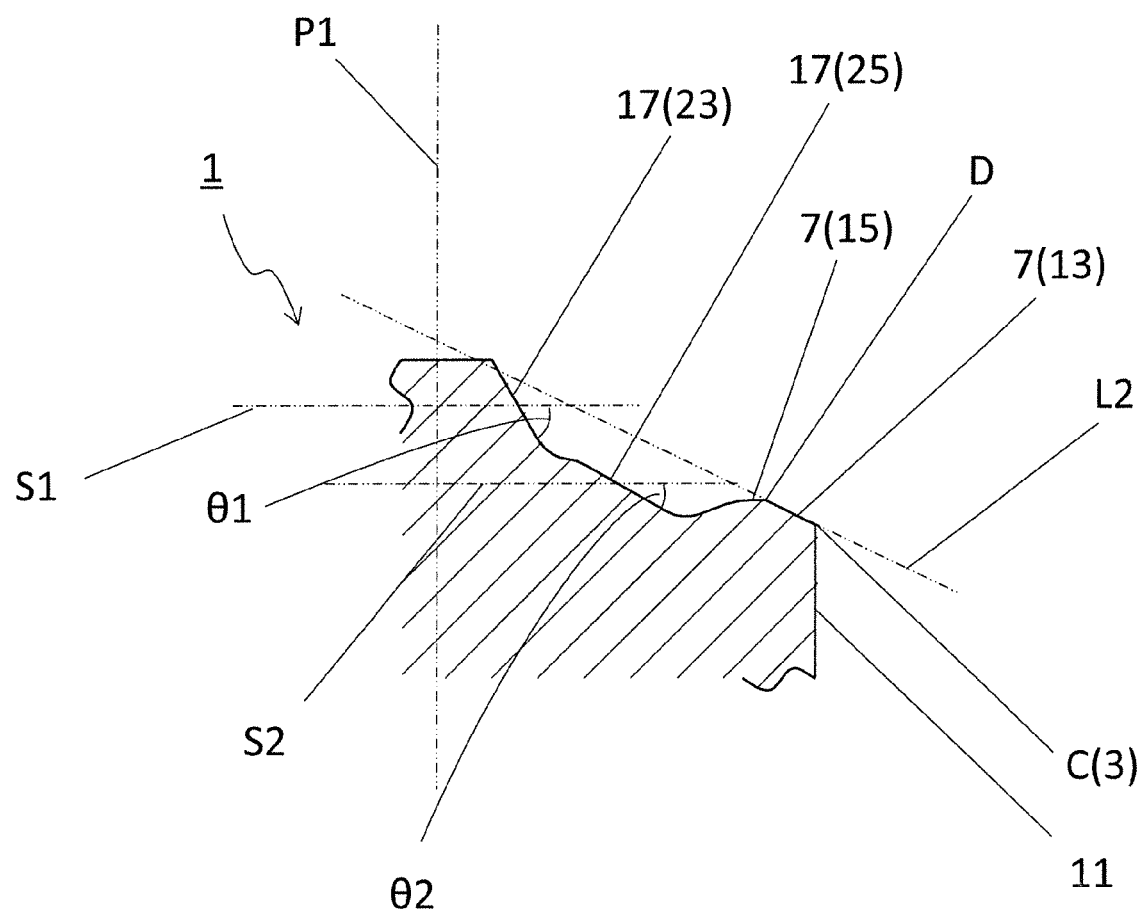
FIG. 7 is a cross-sectional view illustrating a cutting insert in the non-limiting aspects of the present disclosure.

The third region 17 may intersect with the second imaginary straight line L2 as in a non-limiting embodiment illustrated in FIG. 7. If the insert 1 includes the above configuration, chips may tend to come into contact with the third region 17 not only at a position on an orthogonal line of the first side 5 in a plan view, but also at a position on the bisector of the first corner 3 in the plan view. This may facilitate to stabilize behavior of chips. FIG. 7 may be a diagram illustrating a non-limiting aspect in the present disclosure. FIG. 7 may be a cross-section corresponding to FIG. 6.

Figure 8:
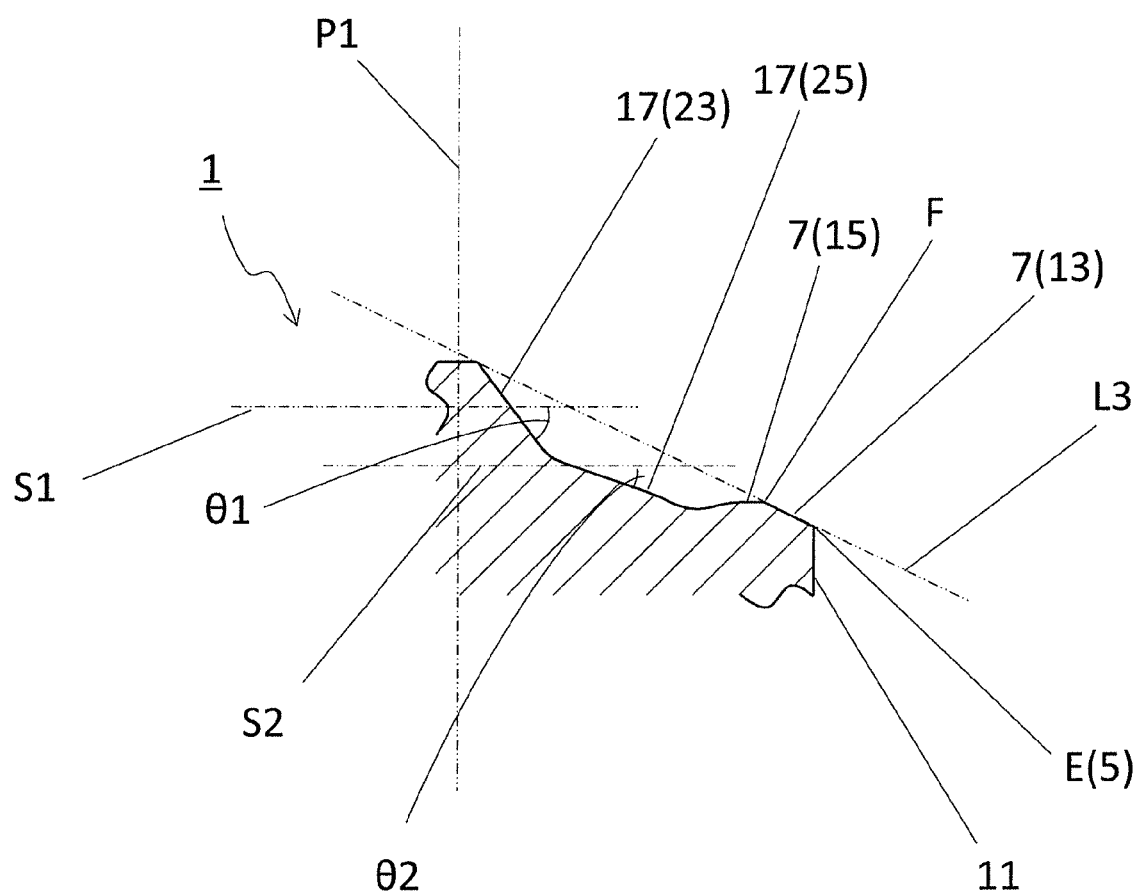
FIG. 8 is a cross-sectional view taken along the line VIII-VIII in FIG. 4.

Alternatively, the third region 17 may be located away from a third imaginary straight line L3 as in a non-limiting embodiment illustrated in FIG. 8. Here, it may be assumed that a point on the first side 5 which is located further away from the first corner 3 than the first point A is a fifth point E. The first side 5 may include the fifth point E. FIG. 8 may illustrate a cross section that passes through the fifth point E and is orthogonal to the first side 5 in a plan view. A boundary between the first region 13 and the second region 15 may be a sixth point F as illustrated in FIG. 8. Similarly to the FIG. 5, the boundary between the first region 13 and the second region 15 may be indicated by a point in a sectional view as illustrated in FIG. 8. An imaginary straight line passing through the fifth point E and the sixth point F may be the third imaginary straight line L3.

With the insert 1 including the above configuration, the third region 17 may not be too close to the cutting edge, and the chips may therefore not be forcibly bent, thereby facilitating to form a good chip shape. Consequently, the chips may be stably discharged, and chip clogging may be less likely to occur.

Still alternatively, the third region 17 may include a first inclined surface 23 and a second inclined surface 25 as in the non-limiting embodiment illustrated in FIG. 4. The second inclined surface 25 may be located closer to the second region 15 than the first inclined surface 23. Specifically, the second inclined surface 25 may be located between the first inclined surface 23 and the second region 15.

As illustrated in FIGS. 5 to 9, an inclination angle of the first inclined surface 23 relative to the reference plane S parallel to the lower surface 5 may be a first angle $\theta 1$. An inclination angle of the second inclined surface 25 relative to the reference plane S may be a second angle $\theta 2$. The first angle $\theta 1$ may be larger than the second angle $\theta 2$. Specifically, as illustrated in FIGS. 5 to 9, the third region 17 may include a portion where the first angle $\theta 1$ is larger than the second angle in a cross section that includes an orthogonal line of the first side and is orthogonal to the reference plane.

Figure 9:
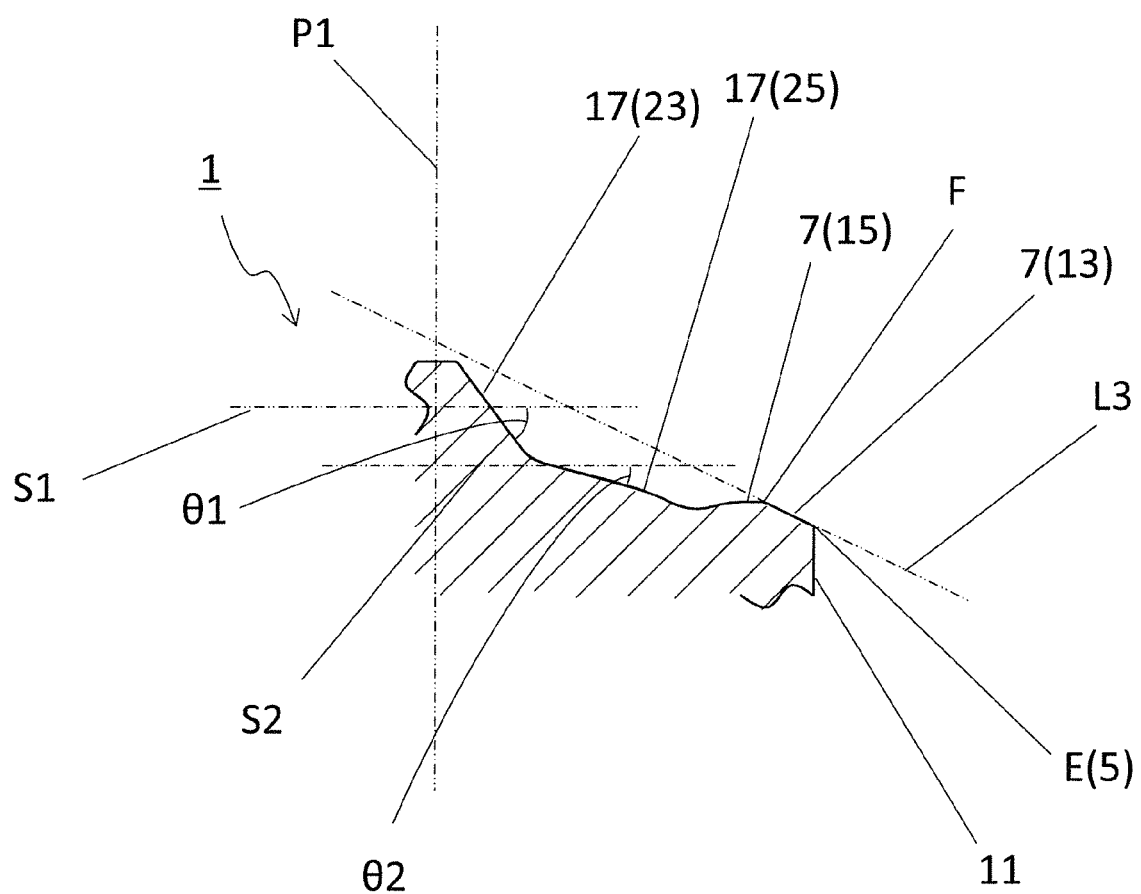
FIG. 9 is a cross-sectional view illustrating a cutting insert in the non-limiting aspects of the present disclosure.

In order to facilitate visual understanding in FIGS. 5 to 9, an imaginary flat surface S1 that is parallel to the reference plane S and intersects with the first inclined surface may be illustrated, and the first angle $\theta 1$ may be indicated by an inclination angle of the first inclined surface 23 relative to the imaginary flat surface S1. An imaginary flat surface S2 that is parallel to the reference plane S and intersects with the second inclined surface 25 may be illustrated, and the second angle $\theta 2$ may be indicated by an inclination angle of the second inclined surface 25 relative to the imaginary flat surface S2. FIG. 9 may be a diagram illustrating other non-limiting aspect in the present disclosure. FIG. 9 may be a cross-section corresponding to FIG. 8.

In cases where the second inclined surface 25 is located closer to the second region 15 than the first inclined surface 23, the second inclined surface 25 may be located closer to the cutting edge than the first inclined surface 23. If the second angle θ2 on the second inclined surface 25 located closer to the cutting edge than the first inclined surface 23 is smaller than the first angle θ1, chips generated by the cutting edge may be likely to be curved gradually instead of being rapidly curved when the chips flow to the third region 17. That is, the chips may be less likely to be forcibly bent at a position in the vicinity of the cutting edge, thereby facilitating to form a good chip shape. Consequently, chip clogging may be less likely to occur.

If the first angle θ1 on the first inclined surface 23 located further away from the cutting edge than the second inclined surface 25 is larger than the second angle θ2, there may be a small distance between the first inclined surface 23 and the cutting edge. The chips may therefore be likely to come into contact with the first inclined surface 23, thus leading to stable behavior of the chips.

Because of the above configuration, if the first angle θ1 is larger than the second angle θ2, the insert 1 may have further enhanced chip discharge performance.

Alternatively, the first side 5 may include a first portion 19 and a second portion 21 as in the non-limiting embodiment illustrated in FIG. 4. The first portion 19 may connect to the first corner 3. The second portion 21 may be located further away from the first corner 3 than the first portion 19.

An orthogonal line of the first portion 19 in a plan view may be a first orthogonal line. An orthogonal line of the second portion 21 in the plan view may be a second orthogonal line. A distance from the first portion 19 to an upper end of the third region 17 on the first orthogonal line may be a first distance. A distance from the second portion 21 to an upper end of the third region 17 on the second orthogonal line may be a second distance. The term "the upper end of the third region 17" may denote a portion of the third region 17 which is located most away from the lower surface 9 in a target range.

Figure 10:
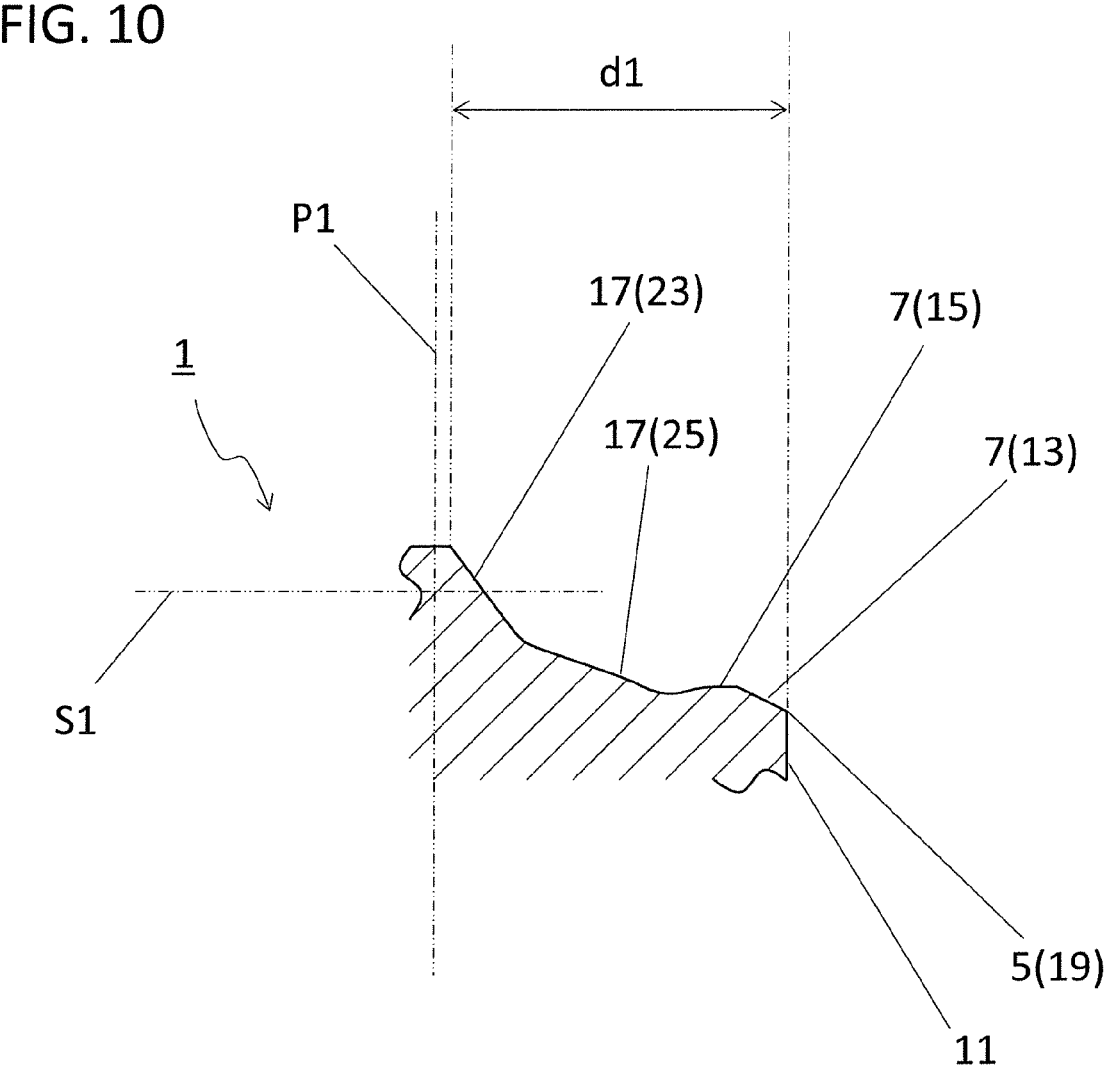
FIG. 10 is a cross-sectional view taken along the line X-X in FIG. 4.
Figure 11:
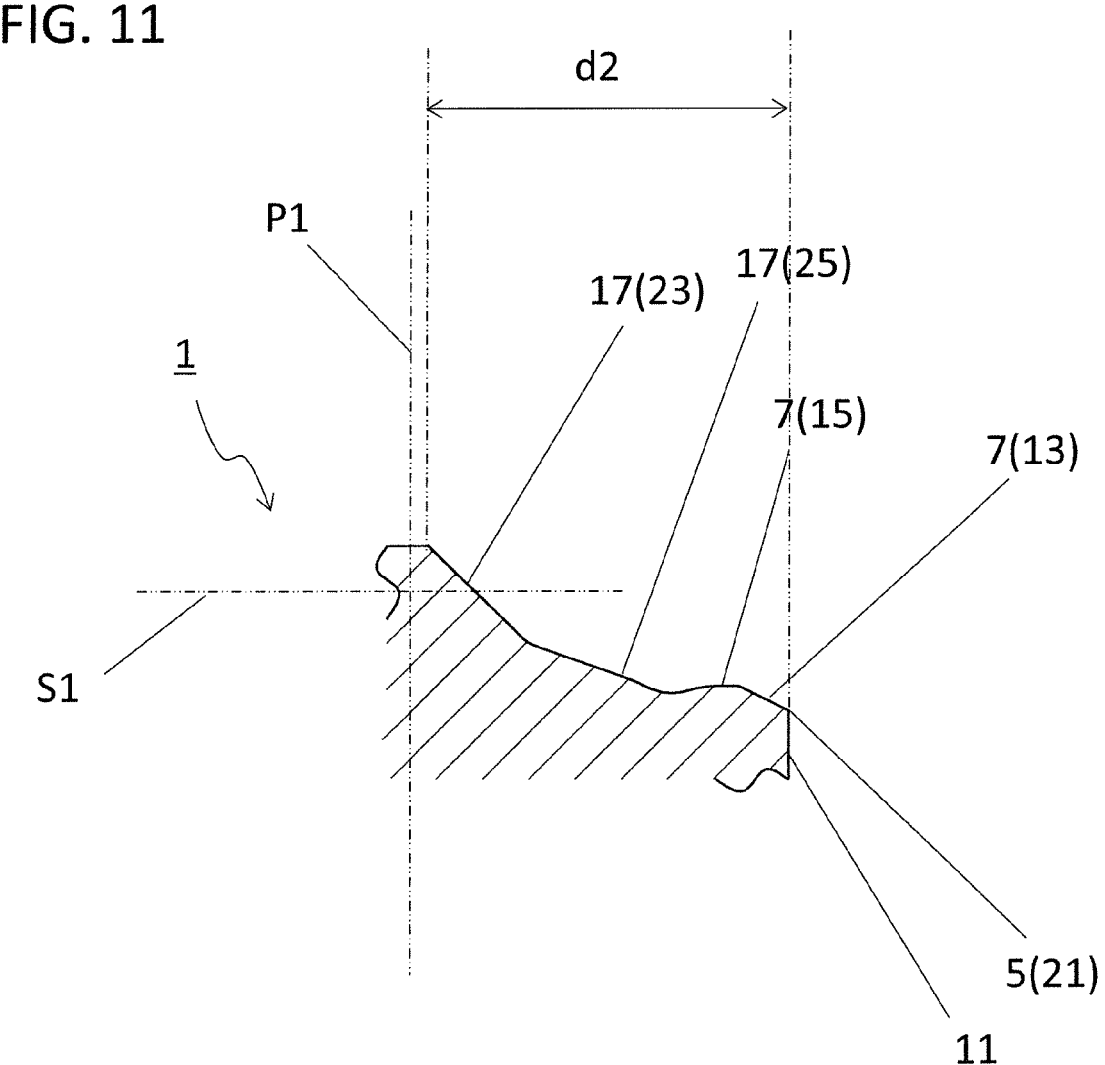
FIG. 11 is a cross-sectional view taken along the line XI-XI in FIG. 4.

The second distance d2 may be larger than the first distance d1. The first distance d1 in a cross section that includes the first orthogonal line and is orthogonal to the reference plane S may be illustrated in a non-limiting embodiment illustrated in FIG. 10. The second distance d2 in a cross section that includes the second orthogonal line and is orthogonal to the reference plane S may be illustrated in a non-limiting embodiment illustrated in FIG. 11.

With the insert 1 including the above configuration, it may be easy to ensure space for discharging chips if the chips flow from the center of the first corner 3 in a direction along the first side 5. This may lead to further enhanced chip discharge performance of the insert 1.

The insert 1 may include a hole 31 that opens into an upper end surface 27 as in the non-limiting embodiment illustrated in FIG. 1. The hole 31 may be extended through a lower end surface 29. The hole 31 is not limited to the above non-limiting embodiments. For example, the hole 31 may open into the lateral surface of the insert 1. Alternatively, the hole 31 may be extended from one of surface regions constituting the lateral surface of the insert 1 to other surface region located on a side opposite to the former surface region. A central axis P2 of the hole 31 may be indicated by two-dot-chain line in FIG. 1. The central axis P2 of the hole 31 may be parallel to the central axis P1 of the cutting part 1b as in the non-limiting embodiment illustrated in FIG. 1.

The hole 31 may be usable as an insertion hole of a fixture for attaching the insert 1 to the holder. Examples of the fixture may include a screw, a clamping member and a wedge.

Examples of material of the cutting part 1b may include cubic boron nitride (cBN) and diamond. Examples of diamond may include PCD (polycrystal diamond). The cutting part 1b may include only one of these materials, or alternatively may include both. If the cutting part 1b may include these materials as a main component, the cutting part 1b may include a material other than these materials. The term "main component" may denote one whose content ratio is the largest in terms of mass ratio.

Examples of material of the base 1a may include cemented carbide, cermet and ceramics. However, the material of the base 1a is not limited to these materials.

The insert 1 may include a configuration other than the base 1a and the cutting part 1b. For example, the insert 1 may further include a coating layer to cover a surface of the base 1a and a surface of the cutting part 1b. The coating layer may cover the whole or a part of a base body formed by the base 1a and the cutting part 1b.

Examples of material of the coating layer may include aluminum oxide (alumina), and carbides, nitrides, oxides, carbon oxides, nitrogen oxides, carbonitrides and carboxynitrides of titanium. The coating layer may include only one or a plurality of the above-mentioned materials.

The coating layer may be formed by only one layer, or alternatively may be a structure in which a plurality of layers are laminated one upon another. The material of the coating layer is not limited to these materials. The coating layer may be located on the base body by using chemical vapor deposition (CVD) method or physical vapor deposition (PVD) method.

<Cutting Tools>

A cutting tool 101 in non-limiting embodiments may be described below with reference to the drawings.

Figure 12:
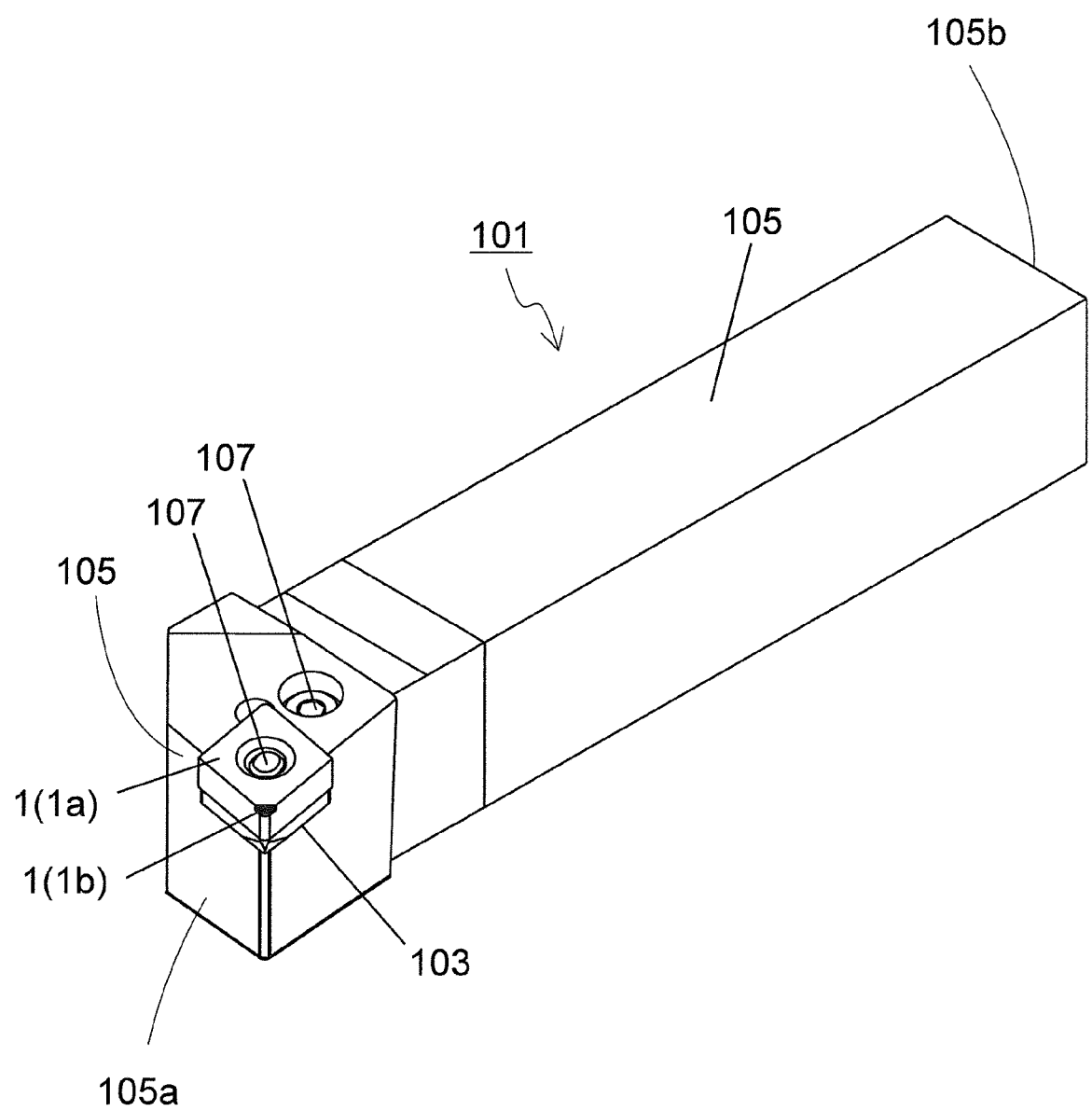
FIG. 12 is a perspective view illustrating a cutting tool in non-limiting aspects of the present disclosure.

As illustrated in FIG. 12, the cutting tool 101 of the non-limiting embodiments may include a holder 105 extended from a first end 105a toward a second end 105b. The holder 105 may include a pocket 103 (insert pocket) at a side of the first end 105a. The cutting tool 101 may include the insert 1 located in the pocket 103. The first corner and at least a part of the first side which is used as a cutting edge may be protruded from the first end 105a of the holder 105.

The holder 105 may have a bar shape that is narrow and long. The pocket 103 may be disposed at a side of the first end 105a of the holder 105. The pocket 103 may be a part that permits attachment of the insert 1. The pocket 103 may open into an end surface at a side of the first end 105a in the holder 105. If the pocket 103 also opens into a lateral surface of the holder 105, it may be easy to attach the insert 1. The pocket 103 may include a seating surface and a constraining lateral surface in a non-limiting embodiment illustrated in FIG. 12. The seating surface may be a surface approximately parallel to a lower surface of the holder 105. The constraining lateral surface may be a surface inclined relative to the seating surface.

The insert 1 may be located in the pocket 103. For example, a lower end surface of the insert 1 may be in direct contact with the pocket 103. Alternatively, a sheet may be interposed between the insert 1 and the pocket 103.

The insert 1 may be attached to the holder 105 by a clamping member 107 as in the non-limiting embodiment illustrated in FIG. 12. The insert 1 may be constrained by the pocket 103 by causing a head of the clamping member 107 to be pressed against an inner wall of the hole of the insert 1.

For example, steel or cast iron may be used as a material of the holder 105. Of these materials, the use of steel may contribute to enhancing toughness of the holder 105.

The cutting tool for use in a so-called turning process may be illustrated in the non-limiting embodiments. Examples of the turning process may include inner diameter processing, outer diameter processing, end surface processing and grooving process. The cutting tool is not limited to one used for the turning process. For example, the insert 1 of the above non-limiting embodiments may be applied to a cutting tool used for a milling process.

<Method for Manufacturing Machined Product>

A method for manufacturing a machined product in non-limiting embodiments may be described below with reference to the drawings.

The machined product may be manufacturable by carrying out a cutting process of a workpiece 201. The method for manufacturing the machined product in the non-limiting embodiments may include the following steps:

(1) rotating the workpiece 201;

(2) bringing at least a part of the first corner and the first side in the cutting tool 101 represented by the above non-limiting embodiments which is used as a cutting edge, into contact with the workpiece 201 being rotated; and (3) moving the cutting tool 101 away from the workpiece 201.

Figure 13:
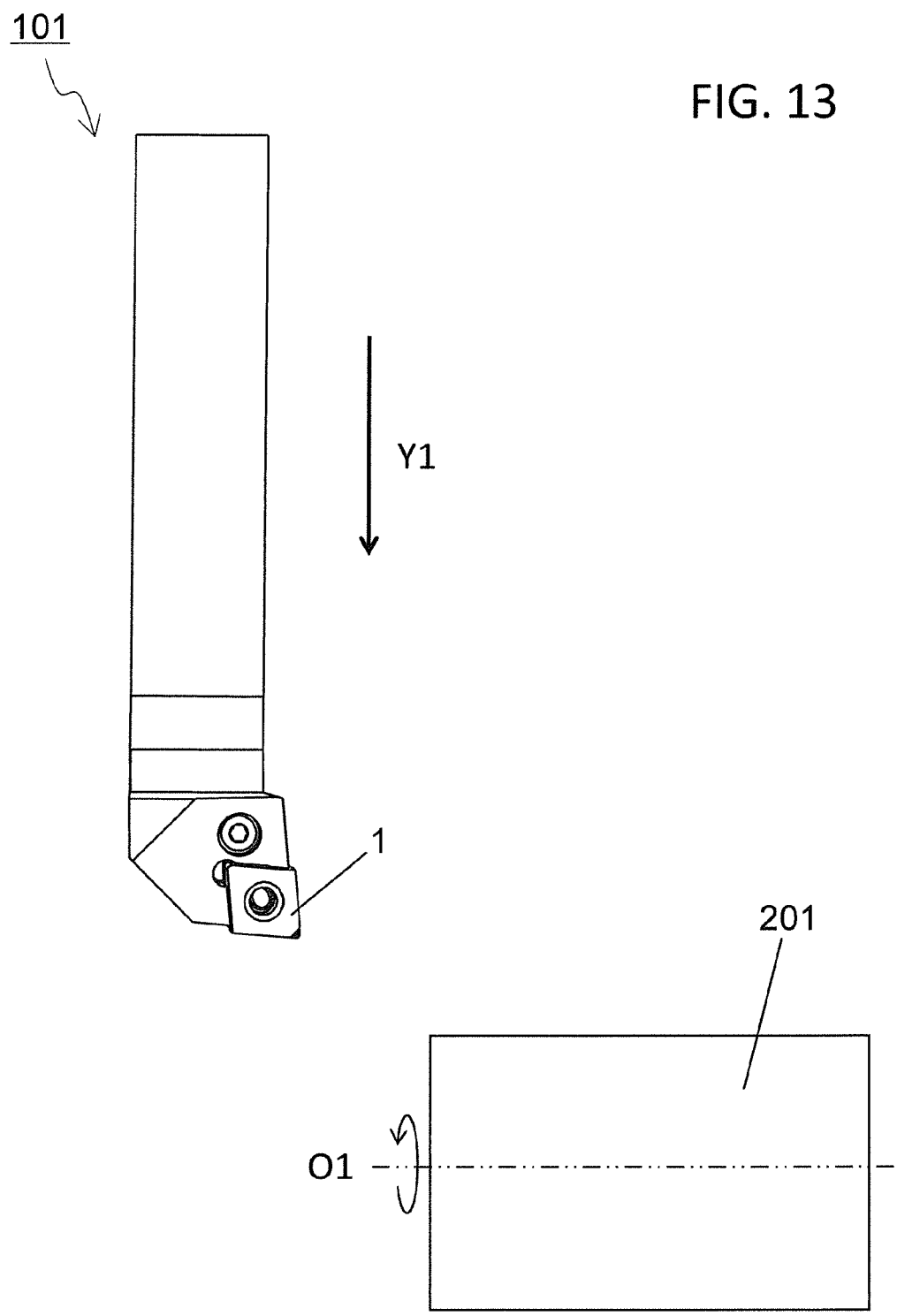
FIG. 13 is a diagram illustrating one of steps in a method for manufacturing a machined product in non-limiting aspects of the present disclosure.
Figure 14:
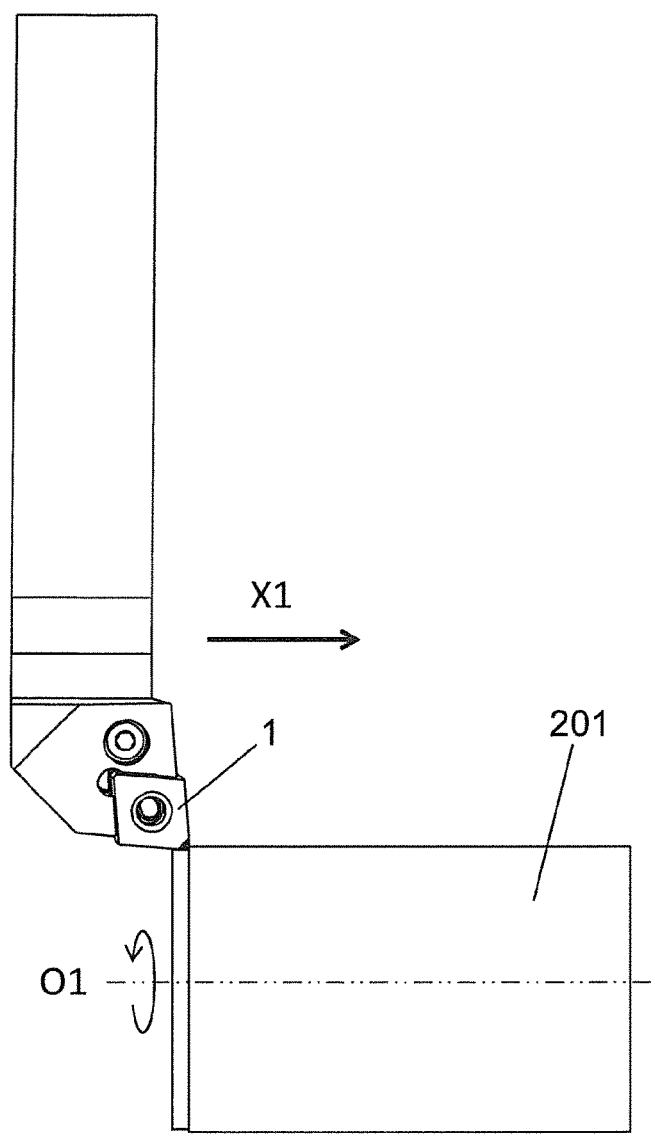
FIG. 14 is a diagram illustrating one of the steps in the method for manufacturing a machined product in the non-limiting aspects of the present disclosure.
Figure 15:
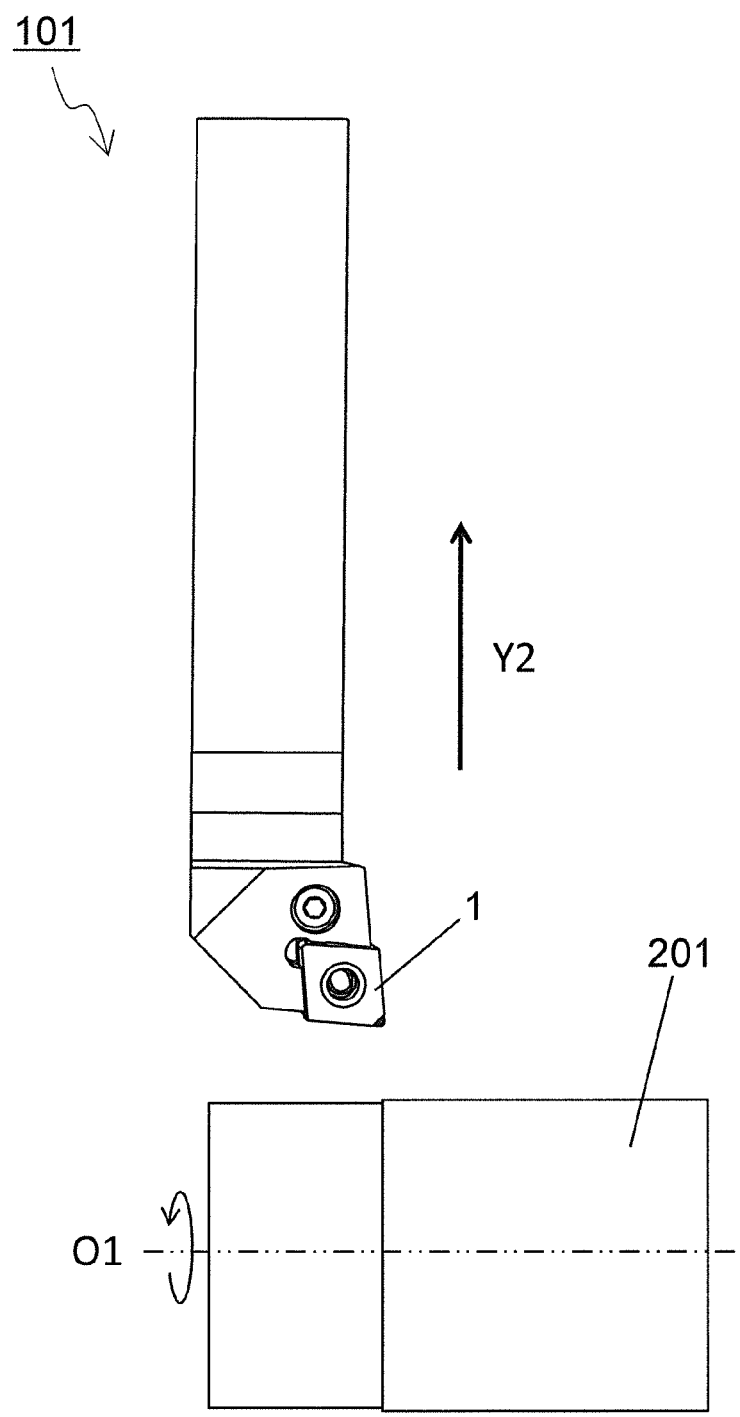
FIG. 15 is a diagram illustrating one of the steps in the method for manufacturing a machined product in the non-limiting aspects of the present disclosure.

More specifically, firstly, the cutting tool 101 may be relatively brought near the workpiece 201 while rotating the workpiece 201 around an axis O1 as illustrated in FIG. 13. The workpiece 201 may be then cut out by bringing at least a part of the first corner and the first side in the cutting tool 101 which is used as a cutting edge into contact with the workpiece 201 as illustrated in FIG. 14. Thereafter, the cutting tool 101 may be relatively moved away from the workpiece 201 as illustrated in FIG. 15.

The cutting tool 101 may be brought near the workpiece 201 by moving the cutting tool 101 in a Y1 direction in a state where the axis O1 is fixed and the workpiece 201 is rotated. The workpiece 201 may be cut out by bringing at least a part of the first corner and the first side in the insert 1 which is used as a cutting edge, into contact with the workpiece 201 being rotated, and by being moved in an X1 direction. The cutting tool 101 may be moved away from the workpiece 201 by moving the cutting tool 101 in a Y2 direction in a state where the workpiece 201 is rotated.

In the cutting process with the manufacturing method in the non-limiting embodiments, the cutting tool 101 may be brought into contact with the workpiece 201, or the cutting tool 101 may be moved away from the workpiece 201 by moving the cutting tool 101 in the individual steps. However, it is not intended to limit to this non-limiting embodiment.

For example, the workpiece 201 may be brought near the cutting tool 101 in the step (1). Similarly, the workpiece 201 may be moved away from the cutting tool 101 in the step (3). If desired to continue the cutting process, the step of bringing at least a part of the first corner and the first side in the insert 1 which is used as a cutting edge, into contact with different portions of the workpiece 201 may be repeated while keeping the workpiece 201 rotated.

Representative examples of material of the workpiece 201 may include hardened steel, carbon steel, alloy steel, stainless steel, cast iron and nonferrous metals.

DESCRIPTION OF THE REFERENCE NUMERAL 1 cutting insert (insert)
1a base
1b cutting part
3 corner
5 first side
7 first surface (upper surface)
9 second surface (lower surface)
11 third surface (lateral surface)
13 first region
15 second region
17 third region
19 first portion
21 second portion
23 first inclined surface
25 second inclined surface
27 upper end surface
29 lower end surface
31 hole
101 cutting tool
103 pocket
105 holder
107 clamping member
201 workpiece
P1 central axis
P2 central axis
θ1 first angle
θ2 second angle
θ3 third angle
θ4 fourth angle
L1 first imaginary straight line
L2 second imaginary straight line
L3 third imaginary straight line
M bisector
S reference plane
S1 imaginary flat surface
S2 imaginary flat surface

The invention claimed is:

1. A cutting insert, comprising:
a base; and
a cutting part comprising a sintered body of cubic boron nitride or diamond and connecting to the base, wherein the cutting part comprises:
 a first surface,
 a second surface located on a side opposite to the first surface, and
 a third surface located between the first surface and the second surface,
wherein the first surface comprises:
 a corner,
 a first side extended from the corner,
 a first region located along the corner and the first side and inclined upward toward an inner part of the first surface,
 a second region which is located along the first region on a more inner part than the first region, and which is inclined relative to the first region, and which is located closer to or parallel to the second surface as going toward the inner part of the first surface, and
 a third region which is located at a more inner part than the second region, and which is inclined so as to be located further away from the second surface as going toward the inner part of the first surface, wherein the third region comprises:
a first inclined surface, and
a second inclined surface located closer to the second region than the first inclined surface, and
wherein:
a boundary between the corner and the first side is a first point,
a cross section that passes through the first point and is orthogonal to the first side in a plan view of the first surface is a first cross section,
a boundary between the first region and the second region is a second point in the first cross section,
an imaginary straight line passing through the first point and the second point is a first imaginary straight line,
the first imaginary straight line intersects with the third region in the first cross section,
an imaginary straight line passing through a center of the first surface and a center of the second surface is a central axis,
a first imaginary flat surface orthogonal to the central axis is a reference plane, and
a first angle that is an inclination angle of the first inclined surface relative to a second imaginary flat surface parallel to the reference plane is larger than a second angle that is an inclination angle of the second inclined surface relative to a third imaginary flat surface parallel to the reference plane in the first cross section.

2. The cutting insert according to claim 1, wherein
a boundary between the third surface and the first region is a third point and a boundary between the second region and the first region is a fourth point at a position on a bisector of the corner in a plan view of the first surface,
a cross section which includes the bisector and is orthogonal to the corner is a second cross section,
an imaginary straight line passing through the third point and the fourth point is a second imaginary straight line, and
the third region is located away from and below the second imaginary straight line in the second cross section.

3. The cutting insert according to claim 1, wherein
the first side comprises a fifth point located further away from the corner than the first point,
a cross section that passes through the fifth point and is orthogonal to the first side in the plan view is a third cross section,
a boundary between the second region and the first region is a sixth point in the third cross section,
an imaginary straight line passing through the fifth point and the sixth point is a third imaginary straight line, and
the third region is located away from the third imaginary straight line in the third cross section.

4. The cutting insert according to claim 1, wherein
the first side comprises
a first portion connecting to the corner, and
a second portion located further away from the corner than the first portion,
in the plan view of the first surface,
a line orthogonal to the first portion in the plan view of the first surface is a first orthogonal line, and a line orthogonal to the second portion in the plan view of the first surface is a second orthogonal line,
a distance from the first portion to a portion of the third region which is located most away from the second surface on the first orthogonal line is a first distance,
a distance from the second portion to a portion of the third region which is located most away from the second surface on the second orthogonal line is a second distance, and
the second distance is larger than the first distance.

5. A cutting tool, comprising:
a holder extended from a first end toward a second end and comprising a pocket located at a side of the first end; and
the cutting insert according to claim 1, the cutting insert being located in the pocket.

6. A method for manufacturing a machined product, comprising:
rotating a workpiece;
bringing the cutting tool according to claim 5 into contact with the workpiece being rotated; and
moving the cutting tool away from the workpiece.

\* \* \* \* \*